United States Patent [19]

Namera et al.

[11] Patent Number: 4,958,788
[45] Date of Patent: Sep. 25, 1990

[54] ORBIT CONTROL SYSTEM FOR A SATELLITE

[75] Inventors: Takakazu Namera; Naoto Ogura, both of Tokyo, Japan

[73] Assignee: NEC Corporation, Japan

[21] Appl. No.: 423,618

[22] Filed: Oct. 16, 1989

Related U.S. Application Data

[63] Continuation of Ser. No. 339,961, Apr. 18, 1989, abandoned, which is a continuation-in-part of Ser. No. 66,091, Jun. 24, 1987, abandoned.

[30] Foreign Application Priority Data

Jun. 26, 1986 [JP] Japan ............................. 61-150221

[51] Int. Cl.$^5$ ............................................... B64G 1/26
[52] U.S. Cl. .................................................. 244/169
[58] Field of Search ...................... 244/164, 169, 170; 364/459

[56] References Cited

U.S. PATENT DOCUMENTS

| 3,643,897 | 2/1972 | Johnson, Jr. | 244/169 |
| 4,386,750 | 6/1983 | Hoffman | 244/169 |
| 4,537,375 | 8/1985 | Chan | 244/169 |

Primary Examiner—Galen Barefoot
Attorney, Agent, or Firm—Ostrolenk, Faber, Gerb & Soffen

[57] ABSTRACT

A system for controlling the orbit of a satellite by operating a plurality of thrusters is disclosed. In the system, an actual attitude of the satellite is sensed, an evaluation is set up on the basis of the sensed attitude and compared with a threshold which is adequately changing, and the ON-OFF condition of the firing of the thrusters is based on the relationship between the evaluation value and the threshold.

5 Claims, 8 Drawing Sheets

Fig. 7A PRIOR ART1

Fig. 7B PRIOR ART1

Fig.9A INVENTION

Fig.9B INVENTION 4,958,788

ORBIT CONTROL SYSTEM FOR A SATELLITE

This is a continuation of application Ser. No. 339,961 filed on Apr. 18, 1989, which is a continuation-in-part of application Ser. No. 066,091 filed on Jun. 24, 1987, both now abandoned.

BACKGROUND OF THE INVENTION

The present invention relates to a system for controlling the orbit of a satellite by adequately controlling a plurality of thrusters.

As well known in the art, the orbit of a satellite is affected by various factors and, when effected beyond a certain range which is allowable for a particular mission, a plurality of gas jet thrusters or like suitable propulsion devices mounted on the satellite are activated to correct the orbit. Additionally, the attitude or orientation of a satellite has to be controlled within an allowable range in relation to a particular mission.

Usually, thrusters for orbit control are positioned such that their thrust vectors extend through the center of gravity of a satellite, whereby disturbance torque which acts on the satellite in the event of activation of any of the thrusters is eliminated. In practice, however, it often occurs that the thrust vectors of thrusters do not extend through the center of gravity of a satellite due to errors introduced at the time of production or, even if they do extend through the center of gravity, gas jetted from the thrusters impinges on a part of the satellite such as solar cell panels or a satellite body, producing disturbance torque. Because the disturbance torque produced by thrusters is far greater than solar radiation pressure and other environmental disturbance torque, the accuracy of attitude control during orbit control inevitably deteriorates unless adequate measures are taken.

An implemention for orbit control known in the art consists in firing thrusters continuously all through the orbit control, i.e., jetting gas from thrusters continuously over the whole period between the start and the end of orbit control. Such an implementation, however, has a drawback that at the beginning and end of orbit control there occurs a stepwise fluctuation of disturbance torque due to the jets from thrusters, resulting that the attitude suffers from a substantial transient while an attitude control function absorbs the stepwise disturbance torque.

A satellite orbit control system disclosed in, for example, Japanese Patent Laid-Open Publication (Kokai) No. 58-161699 provides one approach to solve the above-stated problem of the prior art system, i.e., the transient of attitude which occurs at the beginning and end of orbit control. Specifically, the system disclosed sequentially varies the proportion of firing duration of thrusters to the ON-OFF repetition period of thrusters, which is constant. The ratio of firing duration to the period mentioned is varied in a predetermined pattern.

In such an orbit control system, however, the firing duration is set up unchangeably based on presumable conditions of external disturbance and without regard to actual attitudes of a satellite. The system, therefore, cannot cope with unexpected magnitudes of disturbance and achieve the desired object.

SUMMARY OF THE INVENTION

It is therefore an object of the present invention to provide an orbit control system capable of controlling the orbit of a satellite in relation to an actual attitude of the satellite.

It is another object of the invention to provide an orbit control system capable of reducing the transient attitude error of a satellite occurring, for example, at the beginning of orbit control.

It is another object of the invention to provide a generally improved orbit control system for a satellite.

A system for controlling the orbit of a satellite which has a plurality of thrusters of the present invention comprises a sensing means for sensing an attitude of the satellite; a setting means for setting up a predetermined evaluation value in response to an output of the sensing means; OFF control means for turning OFF an orbit control thruster when, at least during a predetermined period of time after the initiation of orbit control, the evaluation value exceeds a given value of a threshold A which is sequentially varied; and ON control means for turning ON the orbit control thruster when, at least during the predetermined period of time, the evaluation value after the orbit control thruster has been turned OFF becomes smaller than a given value of a threshold B, which is sequentially varied.

The above and other objects, features and advantages of the present invention will become more apparent from the following detailed description taken with the accompanying drawings.

DESCRIPTION OF THE PREFERRED EMBODIMENT

To better understand the present invention, a brief reference will be made to two different prior art satellite orbit control systems.

Figure 1:
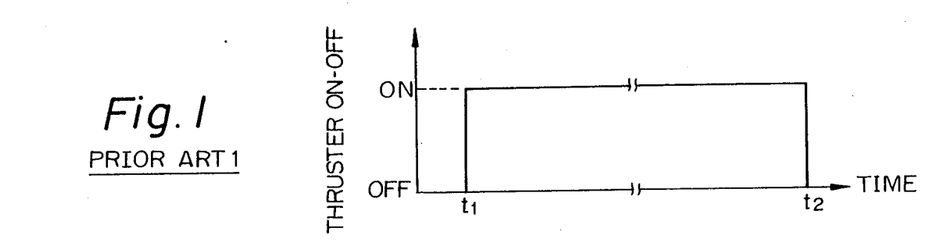
FIG. 1 is a chart representative of the operation of a thruster in accordance with a prior art satellite orbit control system.

Referring to FIG. 1, there is shown a manner of firing of thrusters which are controlled by a prior art orbit control system (hereinafter referred to as PRIOR ART 1 for convenience). In FIG. 1, the abscissa shows time and the ordinate, ON-OFF of the thrusters. As shown, the thrusters are continuously fired, or held in an ON state, while the orbit control is under way, allowing an undesirable stepwise fluctuation to occur in the disturbance torque at the beginning $t_1$ and the end $t_2$ of orbit control. This directly translates into a substantial transient of the attitude error which occurs when an attitude control function absorbs such stepwise disturbance torque.

Figure 2A:
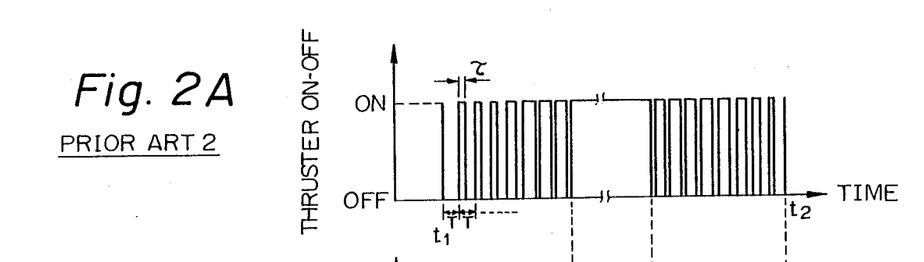
FIGS. 2A and 2B are charts representative of the operation of a thruster in accordance with another prior art satellite orbit control system.
Figure 2B:
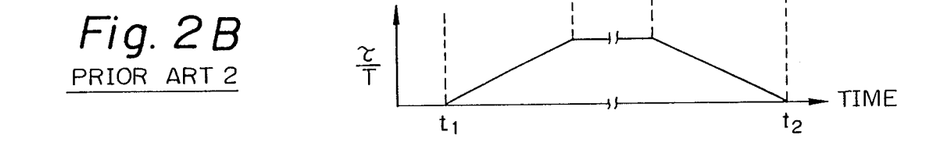

FIGS. 2A and 2B show a manner of firing of thrusters in accordance with another prior art orbit control system as disclosed in Japanese Patent Laid-Open Publication (Kokai) No. 58-161699 (hereinafter referred to as PRIOR ART 2) for eliminating the drawback inherent in PRIOR ART 1. In FIG. 2A, the abscissa shows time and the ordinate, ON-OFF of the thrusters. In FIG. 2B, the abscissa shows time and the ordinate, the ratio of firing duration $\tau$ to ON-OFF repetition period T (constant) of the thruster. In both of FIGS. 2A and 2B, $t_1$ and $t_2$ are representative of, respectively, the times at which the orbit control begins and ends. In order to suppress the transient of attitude error of a satellite which occurs at the beginning $t_1$ and end $t_2$ of orbit control, the system of PRIOR ART 2 sequentially changes the ratio of firing duration $\tau$ to constant ON-OFF repetition period T during a predetermined period of time immediately after the beginning $t_1$ of orbit control and a predetermined period of time immediately before the end $t_2$ of the same, as shown in FIG. 2A. The ratio of firing duration $\tau$ to period T is varied in a predetermined pattern, as shown in FIG. 2B. In such an orbit control system, however, the firing duration is set up unchangeably based on presumable conditions of disturbance and with no regard to actual attitude of a satellite. The system, therefore, cannot cope with unexpected magnitude of external disturbance and fails to achieve the desired object.

Described below is an orbit control system of the present invention which solves the problems of the systems of PRIOR ARTs 1 and 2. The description begins with the outline of the orbit control system.

Assume that thrusters are actuated to start the firing of gas in order to control the orbit of a satellite. Then, a substantial level of stepwise disturbance is caused because the plume of thrusters impinges on a part of the satellite such as a solar cell panel or the body of the satellite or, because the thrust vectors of the thrusters fail to extend through the center of gravity of the satellite due to production errors, or for other various reasons. While such disturbance is absorbed by an attitude control function, a substantial transient error angle is developed in the attitude of the satellite.

In accordance with the system of the present invention, a sensing means senses an instantaneous attitude of a satellite and delivers its output to a setting means.

In response, the setting means sets up a predetermined evaluation value and delivers it to an OFF control means and an ON control means. The words "evaluation value" should be understood to be a numerical value representative of a parameter which is adequate for the evaluation of an actual condition of attitude control, e.g., attitude angle, attitude angular velocity, or a linear combination thereof. The evaluation value is set up on the basis of the previously mentioned transient error angle. More specifically, the words "evaluation value" refers to a value computed by an attitude control logic which a designer may freely set up on the basis of an attitude error angle. While the simplest evaluation value is the attitude error angle itself, the evaluation value may be implemented as any of other various forms such as weighted sum of attitude error angle and angular rate and a weighted sum of attitude error angle and angular rate about each axis. The logic for producing the evaluation value depends upon the configuration of a satellite (e.g., moment of inertia and whether or not a bias moment exists), the magnitude of ambient disturbance, the magnitude of control torque, sensor sensitivity, required attitude control accuracy, etc., and is selected, as desired, by a designer of the attitude control system in a manner apparent from the disclosure of the present invention.

When the evaluation value exceeds a certain value of a threshold A due to disturbance which is caused by firing the thrusters at the beginning of orbit control, the OFF control means interrupts the firing of thrusters. Thereafter, as the evaluation value is decreased beyond a certain value of a threshold B with the cause of disturbance removed, the ON control means allows the thruster to be fired. Such a procedure is performed at least over a predetermined period of time after the initiation of orbit control.

During the above-mentioned period of time, the thresholds A and B are individually and sequentially varied in, for example, a linear or a stepwise manner, whereby the firing timing is controlled to promote efficient firing. It is to be noted that the thresholds A and B may be the same as, or different from, each other depending upon the controllability and other factors. Consequently, when any unexpected disturbance is brought about at the initial stage of orbit control, orbit correction and other desired orbit controls can be performed satisfactorily without being adversely affected by the disturbance, i.e., without causing noticeable change in the attitude of the satellite.

The termination of firing invites an abrupt decrease in the disturbance and, therefore, constitutes a kind of disturbance itself. However, this kind of disturbance can be coped with by, for example, elaborating the construction of an attitude control system because the time of occurrence and content of such disturbance can be estimated. It follows that the orbit control system of the present invention may be applied at least to a predetermined period of time at the initial stage of orbit control; the measure against disturbance to follow, e.g., at the final stage of orbit control may be implemented with another suitable system. This is the reason why at least the predetermined period of time after the start of orbit control is selected as the range over which the thresholds A and B are varied.

Figure 3:
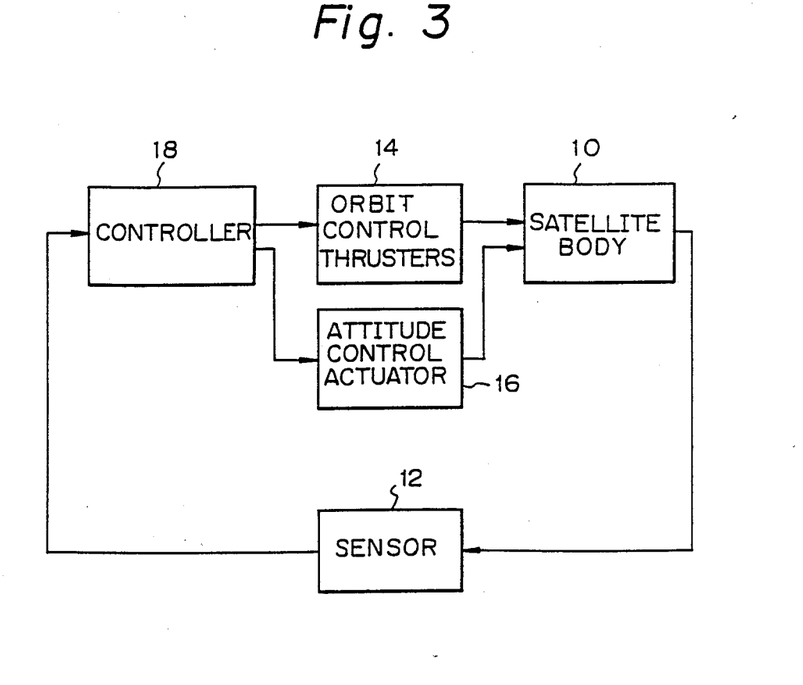
FIG. 3 is a block diagram showing a satellite orbit control system in accordance with the present invention.
Figure 4:
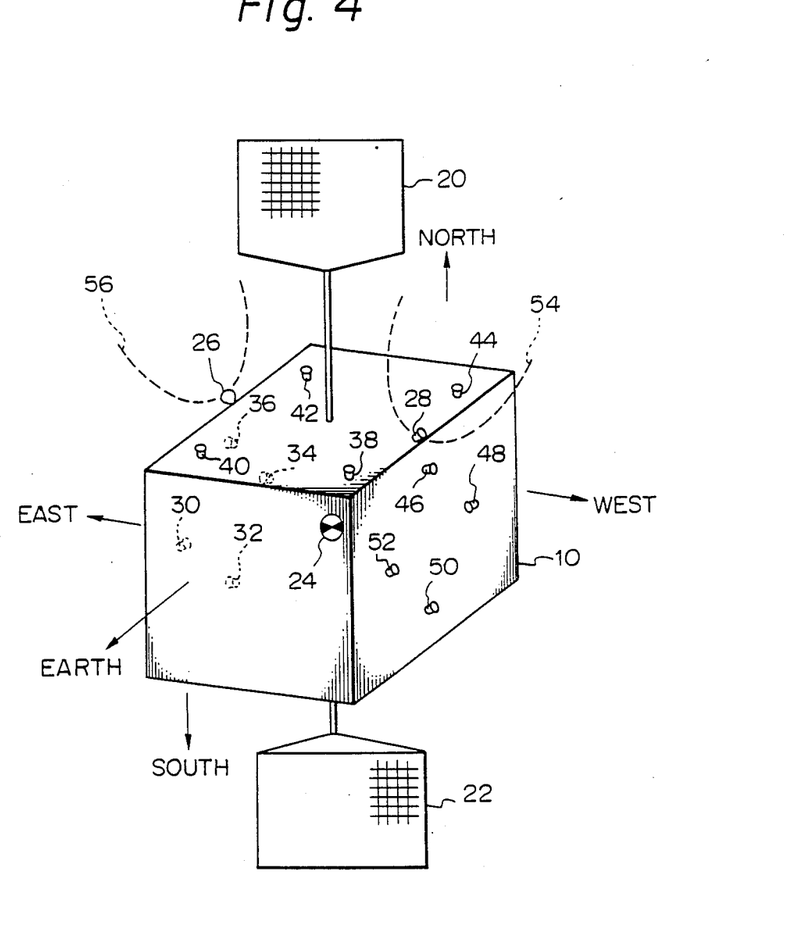
FIG. 4 is a schematic external view of a satellite to which the present invention is applicable.

Referring to FIG. 3, an orbit control system embodying the present invention is shown in a block diagram. As shown, the orbit control system comprises a sensor 12 for sensing an instantaneous attitude of a body 10 of a satellite; a controller 18 for controlling thrusters 14 for orbit control; and an actuator 16 for attitude control, in response to an output of the sensor 12. As well known in the art, while the orbit of a satellite is controlled by thrusters, the attitude of the same may be controlled by any of a thruster system, a reaction wheel system, a magnetic torque system, a momentum wheel system, etc. A satellite to which the present invention is applicable is one whose orbit and attitude are both controlled by thrusters, as shown in FIG. 4. In this sense, the attitude control actuator 16 constitutes attitude control thrusters.

In FIG. 4, there are shown solar cell panels 20 and 22 which are positioned symmetrically to each other in the north-south direction with respect to the center of gravity 24 of the satellite body 10. The panels 20 and 22 are constantly oriented toward the sun by a drive system, not shown, which is installed in the satellite body 10. The panels 20 and 22 and the drive system therefor are generally referred to as a paddle system. Designating thrusters are the reference numerals 26, 28, 30, 32, 34, 36, 38, 40, 42, 44, 46, 48, 50 and 52. Among them, the thrusters 26 and 28, for example, are assigned to orbit control, and the others to attitude control (a part thereof may be assigned to orbit control as well). It should be noted that the number and arrangement of the thrusters shown in FIG. 4 is only illustrative.

Usually each of the orbit control thrusters 26 and 28 is positioned such that the composite vector of their thrust vectors extends through the center of gravity 24. In practice, however, the composite vector often does not extend through the center of gravity 24 due to production or other errors to thereby constitute one cause of disturbance, as stated earlier. Further, thruster plumes 54 and 56 impinge on the solar cell panel 20, satellite body 10, for example, constituting another cause of disturbance torque. In short, a major part of disturbance to attitude control is derived from orbit control, and this implies that if the firing of the orbit control thrusters 26 and 28 is interrupted, the disturbance will be eliminated also. This is the fact on which the present invention is based.

The sensor 12 shown in FIG. 3 is installed in the satellite body 10 to sense an instantaneous attitude of the satellite body 10 itself based on the positions of the sun, stars, earth and others, the output of the sensor 12 being fed to the controller 18 which is also mounted on the satellite body 10. While various kinds of sensors are available such as one which is sensitive to attitude error angle only and one which is sensitive to both of attitude error angle and attitude error angular velocity, the sensor 12 in this particular embodiment is assumed to be sensitive to attitude error angle only.

The controller 18, a major part of which is implemented with a computer, controls the thrusters 26, 28, 30, ..., 52 (FIG. 4), and an attitude control actuator 16 (FIG. 3), to thereby effect a required attitude control operation while, at the same time, effecting an orbit control operation in accordance with the present invention. Specifically, the controller 18 plays multiple the roles of the setting means for setting an evaluation value in response to an output of the sensor 12, the OFF control means for deactuating the orbit control thrusters 14 when the evaluation value exceeds a certain value of a threshold A, and the ON control means for actuating the orbit control thrusters 14 when the evaluation value is reduced to a certain value of a threshold B after the OFF operation. It is to be noted that the thresholds A and B are predetermined such that their values sequentially vary at least over a predetermined period of time after the initiation of orbit control. The thresholds A and B may be the same as, or different from, each other, as previously mentioned.

The foregoing threshold values are freely set up by the designer's decision taking account of particular mission requirements of a satellite such as an antenna pointing accuracy requirement.

Figure 5A:
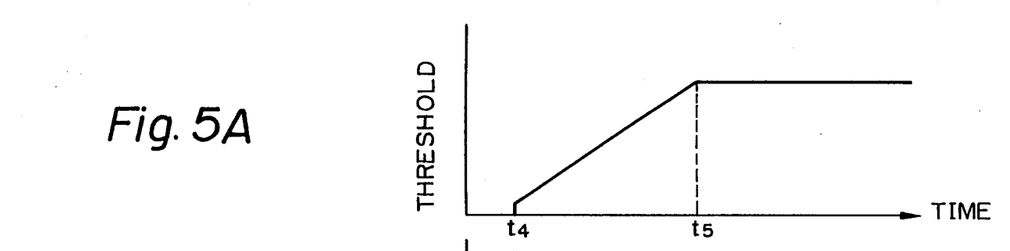
FIGS. 5A to 5C are charts demonstrating the orbit control operation of the present invention.
Figure 5B:
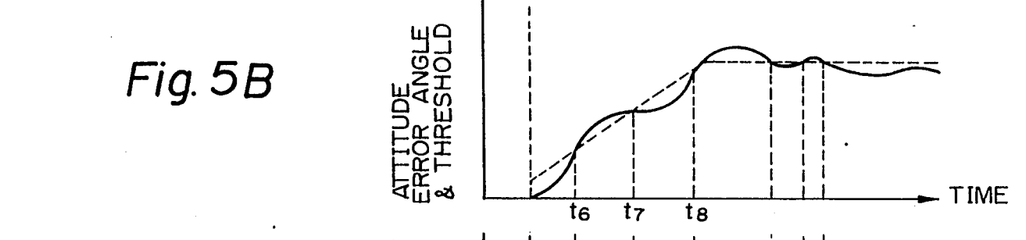
Figure 5C:
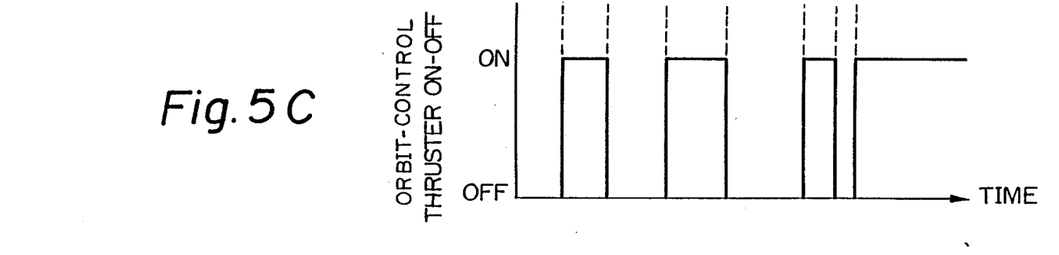

The orbit control in accordance with the present invention which is effected by the controller 18 will be explained with reference to FIGS. 5A to 5C. In FIG. 5A, the ordinate shows threshold and the abscissa, time. In FIG. 5B, the ordinate shows attitude error angle and threshold and the abscissa, time. In FIG. 5C, the ordinate shows ON-OFF of an orbit control thruster and the abscissa, time. In all of these figures, $t_4$ is representative of the beginning of orbit control. Specifically, FIGS. 5A to 5C are representative of an occurrence at an initial stage of orbit control. In FIG. 5A, there is shown a condition in which the threshold (the previously stated thresholds A and B are assumed to be the same here) increases slowly and linearly with the lapse of time as counted from the beginning $t_4$ of orbit control and, after a time $t_5$, settles at a constant value. The values and the manner of variation of the threshold are adequately selected depending upon the construction of the control system as well as upon experience. In FIG. 5B, a variation provided by using attitude error angle for the evaluation value is represented by a solid line in relation to the threshold (dotted line) as shown in FIG. 5A. FIG. 5C shows a manner of ON-OFF control over the orbit control thrusters 14 which occurs when the evaluation value and the threshold are related as shown in FIG. 5B.

In FIGS. 5A to 5C, when orbit control is initiated and the orbit control thrusters 14 are turned ON at the time $t_4$, the attitude error angle is increased due to a resulting disturbance. As the attitude error angel reaches and exceeds the threshold at a time $t_6$, the thrusters 14 are turned OFF to interrupt firing. Then, the disturbance is sharply reduced to zero so that the rate of increase of attitude error angle is lowered. At a time $t_7$, the attitude error angle decreases to and, then, beyond a certain threshold value, causing the thrusters 14 to be actuated again. Such a procedure is repeated so that the attitude control system sequentially absorbs disturbance to reduce the attitude error angle while, at the same time, the firing of thrusters 14 becomes continuous. In this instance, the threshold value is varied according to an adequate sequence in order to prevent the attitude error angle from becoming excessively great and to enhance efficient firing of thrusters 14.

Figure 6:
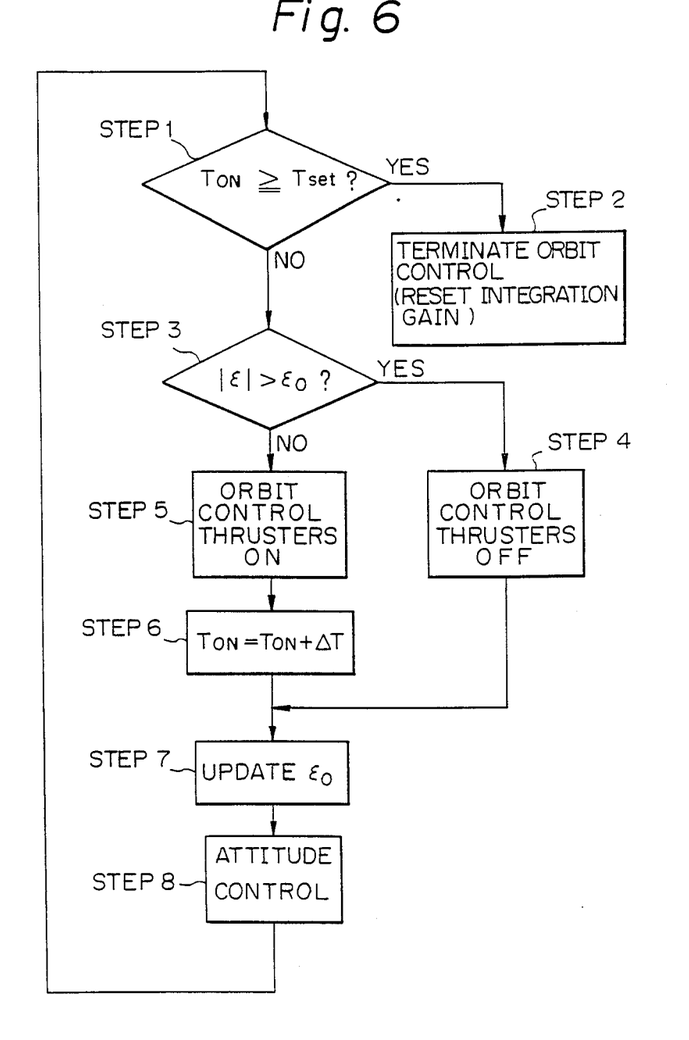
FIG. 6 is a flowchart showing the operation of a controller which is included in the system of the present invention.

Referring to FIG. 6, the operation of the controller 18 is shown in a flowchart. As shown, the controller 18 compares a preset firing time $T_{set}$ of the orbit control thruster as set up at STEP 1 with an actual firing time $T_{on}$ and, if the latter is equal to or greater than the former, terminates the orbit control (STEP 2). If the actual firing time $T_{on}$ is shorter than the preset firing time $T_{set}$, the program advances to STEP 3 for comparing the absolute value $|\epsilon|$ of an attitude error angle as determined by the sensor 12 with a threshold $\epsilon_o$, which varies as a function of time. If $|\epsilon|$ is greater than $\epsilon_o$, the controller 18 turns OFF the thruster (STEP 4) while, if the former is equal to or smaller than the latter, the controller 18 advances to STEP 5 to turn ON the thrusters. At the subsequent STEP 6, the controller 18 performs an operation of $T_{on}=T_{on}+\Delta T$ ($\Delta T$: sampling period of control system) and, then, at STEP 7, updates $\epsilon_o$. Subsequently, the program performs STEP 8 for attitude control.

An attitude control logic is a logic adapted to control the attitude of a satellite such that the attitude error angle $\epsilon$ is kept within some specified value (which is called a threshold herein), by using attitude control actuators. While this logic itself does not form any essential part of the present invention, it may be implemented by, for example, a regulator having a PID control rule as known in the classical control art.

In FIG. 6, the loop including the STEPs 1 to 8 is continuously repeated during orbit control by a cycle time which is selected by a designer.

Figure 7A:
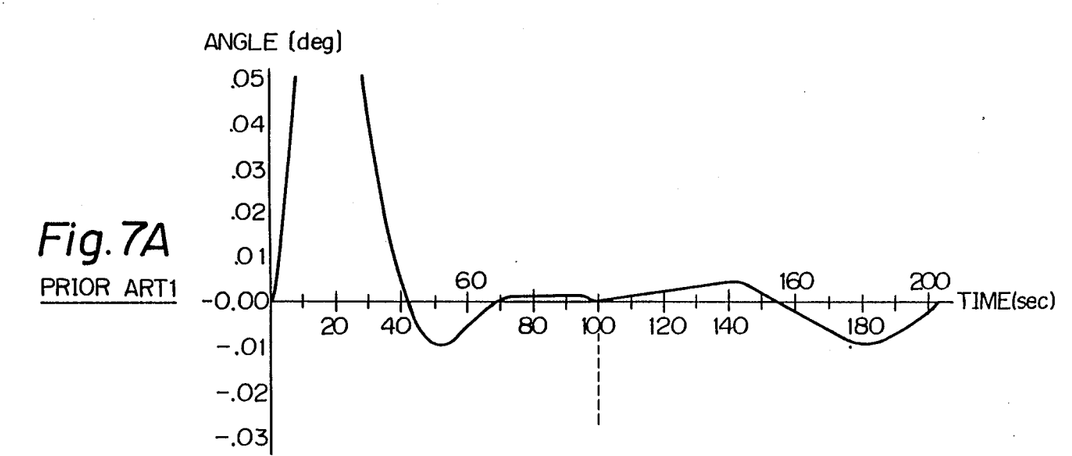
FIGS. 7A and 7B show the result of a simulation which was performed with the prior art system of FIG. 1.
Figure 7B:
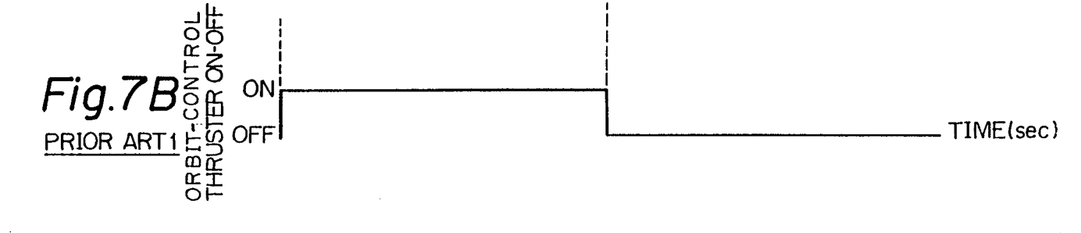
Figures 8A, 8B:
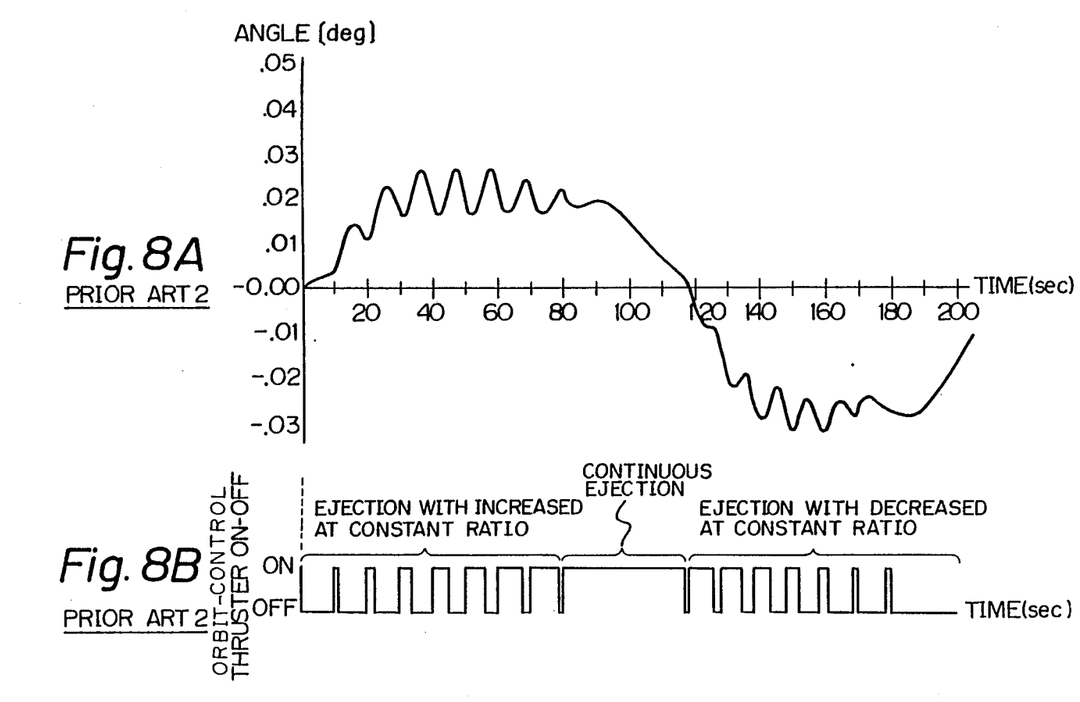
FIGS. 8A and 8B show the result of a simulation which was performed with the prior art system of FIG. 2.
Figure 9A:
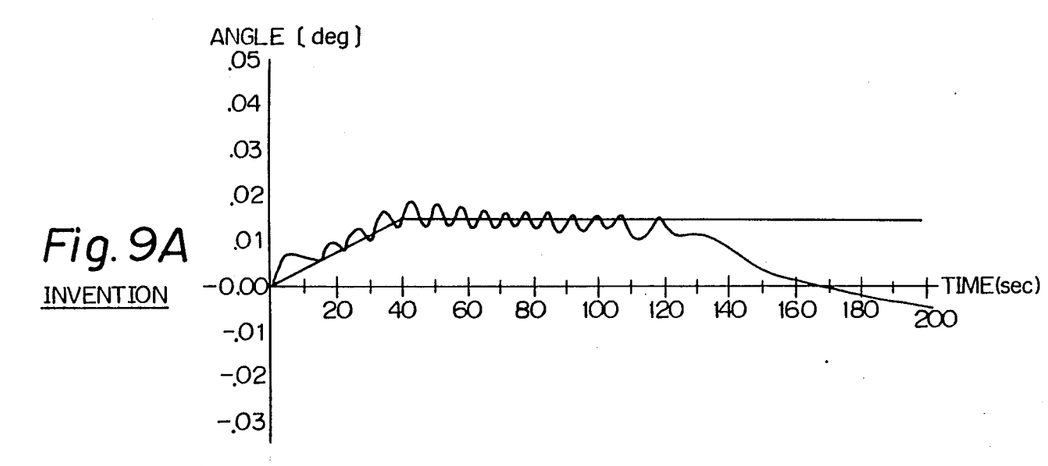
FIGS. 9A and 9B show the result of a simulation which was performed with the system of the present invention.
Figure 9B:
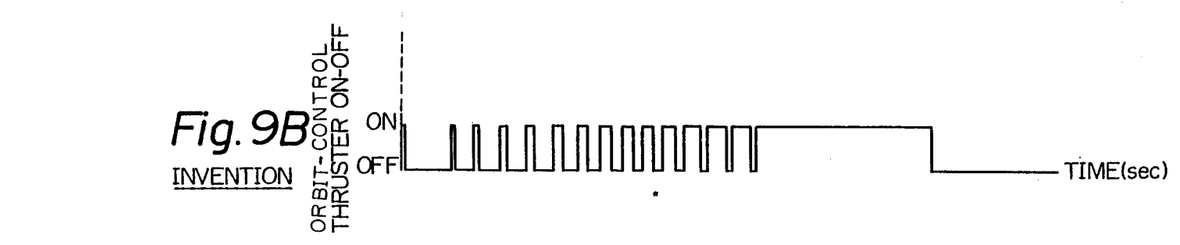

FIGS. 7A and 7B, 8A and 8B, and 9A and 9B show, respectively, the results of simulations which were effected with the system of PRIOR ART 1, the system of PRIOR ART 2, and the system of the present invention. In FIGS. 7A, 8A and 9A, the ordinate is representative of angle (deg) while the abscissa is representative of time. In FIGS. 7B, 8B and 9B, the ordinate shows ON-OFF of the thruster and the abscissa, time.

The simulations were performed under the following conditions.

SIMULATION CONDITIONS

SATELLITE MOMENT OF INERTIA: 13,900 kg.m$^2$
SOLAR CELL PANEL OSCILLATION MODE
1ST-ORDER FLEXIBLE MODE: 4.62 rad/sec
1ST-ORDER FLEXIBLE MODE COUPLING COEFFICIENT: 61.91
1ST-ORDER FLEXIBLE MODE DAMPING COEFFICIENT: 0.001
2ND-ORDER FLEXIBLE MODE: 5.01 rad/sec
2ND-ORDER FLEXIBLE MODE COUPLING COEFFICIENT: 9.23
2ND-ORDER FLEXIBLE MODE DAMPING COEFFICIENT: 0.001
CONTROL LOGIC SAMPLING RATE: 8 Hz
CONTROL SYSTEM DELAY TIME+THRUSTER DELAY TIME: 0.125 sec
THRUSTER MINIMUM PULSE WIDTH: 0.01 sec
DISTURBANCE TORQUE
WHEN ORBIT CONTROL THRUSTERS ARE ON: 0.6 N·m
WHEN ORBIT CONTROL THRUSTERS ARE OFF: 0 N·m
CONTROL TORQUE: 2 N·m
ATTITUDE CONTROL LOGIC
CONTROL SYSTEM BANDWIDTH: 0.16 rad/sec
INTEGRATION GAIN: 20 N/rad·sec (in a continuous time series)
LOW-PASS FILTER PASSBAND: 4.0 rad/sec
ORBIT CONTROL THRUSTERS ON DURATION: 100 sec The three systems are different in the manner of orbit control ON-OFF only and share the same attitude control logic. For the simulations, the use of a large-sized satellite of 2-ton class having large solar cell panels was assumed. Because the bandwidth of the control system available is limited due to the resonance of the solar cell panels, the system of PRIOR ART 1 would produce the substantial transient error at the beginning of orbit control (see FIGS. 7A and 7B). Although the system of PRIOR ART 2 reduces the transient error, it cannot maintain high accuracy unless the setting of ON-OFF sequence of the orbit control thrusters is adjusted depending upon the magnitude of disturbance (see FIGS. 8A and 8B). In contrast, as shown in FIGS. 9A and 9B, the system of the present invention shows the significantly improved control result without regard to the magnitude of disturbance torque, only if the threshold sequence is determined beforehand. (The threshold sequence is determined based on the required control accuracy, the moment of inertia of a body to be controlled, the magnitude of control torque, and others and is not affected by the magnitude of disturbance torque). However, because the proportion of the OFF duration of the orbit control thrusters is increased, with the increase of disturbance torque, the overall period of time required for orbit control would increase.

This simulation holds when the threshold values A and B are the same as each other. The threshold values A and B may be freely selected by the designer's decision to meet particular mission requirements of a satellite such as an antenna pointing accuracy requirement.

Figure 10:
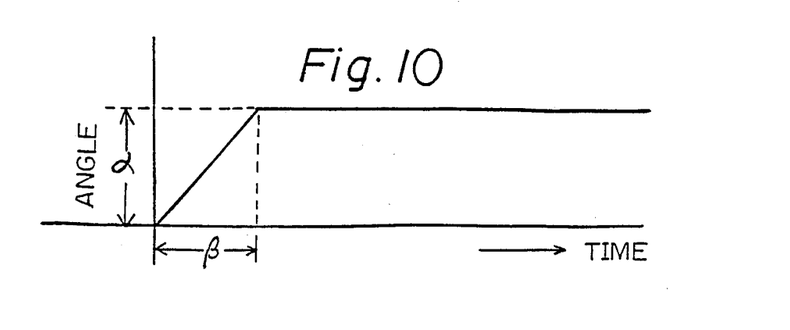
FIG. 10 shows an exemplary method of determining a threshold sequence used in a preferred embodiment of the present invention.

Referring to FIG. 10, an exemplary method of determining a sequence for threshold A or threshold B is based on parameters $\alpha$ and $\beta$ as shown. In a particular embodiment, the thresholds A and B may be set equal to each other.

The parameter $\alpha$ in FIG. 10 is either a simple required error angle or a value which is 70-to-80 percent of the required value with some margin taken into account.

The parameter $\beta$ is produced by $$\alpha \cdot K_d = \tfrac{1}{2} \cdot \alpha \cdot \beta \cdot K_i$$

where $\alpha$ is a design parameter (approximately one-fifth to one-second), $K_d$ is an estimated external disturbance level, and $K_i$ is an integrated gain as considered in a continuous time system. The design parameter $\alpha$ is selected in view of the likelihood of an estimated value of external disturbance level or the ratio of external disturbance torque to satellite moment of inertia. Although an increase in the design parameter $\alpha$ reduces the value of overshoot, it increases the period of time necessary for orbit control.

As described hereinabove, an orbit control system in accordance with the present invention senses an actual attitude of a satellite, compares an evaluation value, which is set up on the basis of the sensed attitude, with an adequately varying threshold, and ON-OFF controls the thrusters based on the relationship between the evaluation value and the threshold. In short, when disturbance is great in relation to an actual orientation of a satellite, the firing of thrusters is interrupted to remove the cause of disturbance. Hence, even if the disturbance has an unexpected large magnitude, the transient of satellite attitude error can be positively reduced without being influenced by the disturbance, at least at the initial stage of orbit control. Further, because the firing timing is controlled by varying the threshold, the efficiency of firing thrusters is enhanced.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A system for controlling orbit of a satellite which has a plurality of gas jet thrusters, comprising:
    a sensing means for sensing an attitude of the satellite;
    a setting means for setting up a predetermined evaluation value in response to an output of said sensing means;
    OFF control means for turning OFF an orbital control thruster when, at least during a predetermined period of time after the initiation of orbit control, the evaluation value exceeds a given value of a threshold A which is sequentially varied to prevent an attitude error angle of the satellite from becoming excessively high; and ON control means for turning ON said orbital control thruster when, at least during said predetermined period of time, the evaluation value after said orbital control thruster has been turned OFF becomes smaller than a given value of a threshold B which is sequentially varied to prevent an attitude error angle of the satellite from becoming excessively high.

2. A system as claimed in claim 1, wherein the thresholds A and B are equal to each other.

3. A system as claimed in claim 1, wherein the thresholds A and B are different from each other.

4. A system as defined in claim 1, wherein the predetermined evaluation value is a function of an attitude error angle of the satellite.

5. A system as defined in claim 4, wherein the predetermined evaluation value is proportional to the attitude error angle.

* * * * *